United States Patent [19]

Tanaka

[11] Patent Number: 5,517,370
[45] Date of Patent: *May 14, 1996

[54] SINGLE MOTOR DRIVER FOR A HELICAL SCAN RECORDING/REPRODUCING DEVICE

[75] Inventor: Masato Tanaka, Tokyo, Japan

[73] Assignee: Sony Corporation, Tokyo, Japan

[*] Notice: The term of this patent shall not extend beyond the expiration date of Pat. No. 5,159,507.

[21] Appl. No.: 371,513

[22] Filed: Jan. 11, 1995

Related U.S. Application Data

[63] Continuation of Ser. No. 122,734, Sep. 16, 1993, abandoned, which is a continuation of Ser. No. 624,393, Dec. 7, 1990, abandoned.

[30] Foreign Application Priority Data

Dec. 7, 1989 [JP] Japan .................................. 1-318353
Jun. 26, 1990 [JP] Japan .................................. 2-169078

[51] Int. Cl.$^6$ ................................................. G11B 27/28
[52] U.S. Cl. ........................................ 360/70; 360/77.13
[58] Field of Search .......................... 360/73.11, 73.09, 360/73.04, 70, 73.01, 72.3, 72.2, 71, 85, 77.13

[56] References Cited

U.S. PATENT DOCUMENTS

| | | | |
|---|---|---|---|
| 2,900,444 | 8/1959 | Camras | 360/70 |
| 3,431,353 | 3/1969 | Kihara | 360/70 |
| 3,626,277 | 1/1972 | Pöhler | 360/84 |
| 3,839,730 | 10/1974 | Watanabe | 360/71 |
| 4,003,090 | 1/1977 | Beck | 360/73.09 X |
| 4,307,417 | 12/1981 | Tokuyama | 360/70 X |
| 4,484,235 | 11/1984 | Yokobori | 360/10.2 |
| 4,642,660 | 2/1987 | Stevens, Jr. et al. | 347/38 |
| 4,672,475 | 6/1987 | Nakasho | 360/70 |
| 5,159,507 | 12/1992 | Tamura et al. | 360/95 X |

FOREIGN PATENT DOCUMENTS

| | | | |
|---|---|---|---|
| 0276990 | 1/1988 | European Pat. Off. | G11B 15/467 |
| 58-208915 | 12/1983 | Japan | G11B 5/09 |

OTHER PUBLICATIONS

Patent Abstracts of Japan vol. 8, No. 282 (P-323) (1719) 22 Dec. 1984, & JP-A-59 146406 (Sony) 22 Aug. 1984; * the whole document*.

Patent Abstracts of Japan vol. 13, No. 159 (P-858) 18 Apr. 1989 & JP-A-63 317961 (Sharp) 26 Dec. 1988; *the whole document*.

Patent Abstracts of Japan vol. 9, No. 259 (P-397) 17 Oct. 1985, & JP-A-60 107760 (Nippon Denki) 13 Jun. 1985; *the whole document*.

IEEE Transactions on Consumer Electronics; vol. CE-25, No. 4, Aug. 1979, New York US pp. 440-445; Michio Ozawa: "New Portable Video Cassette Recorder"; * p. 441, left-hand column, line 32—p. 442, right-hand column, line 18; FIGS. 4-5*.

Primary Examiner—Aristotelis Psitos
Assistant Examiner—James T. Wilson
Attorney, Agent, or Firm—Jay H. Maioli

[57] ABSTRACT

A rotary head tape recording and reproducing apparatus drives a rotary drum and a capstan by a common driving motor. In the reproducing mode, rotary heads generate a scanning position detection signal by picking up an address signal indicating the current scanning position from the recording track, and the driving motor is controlled so as to match the scanning position detection signal with a reference scanning position signal.

17 Claims, 13 Drawing Sheets

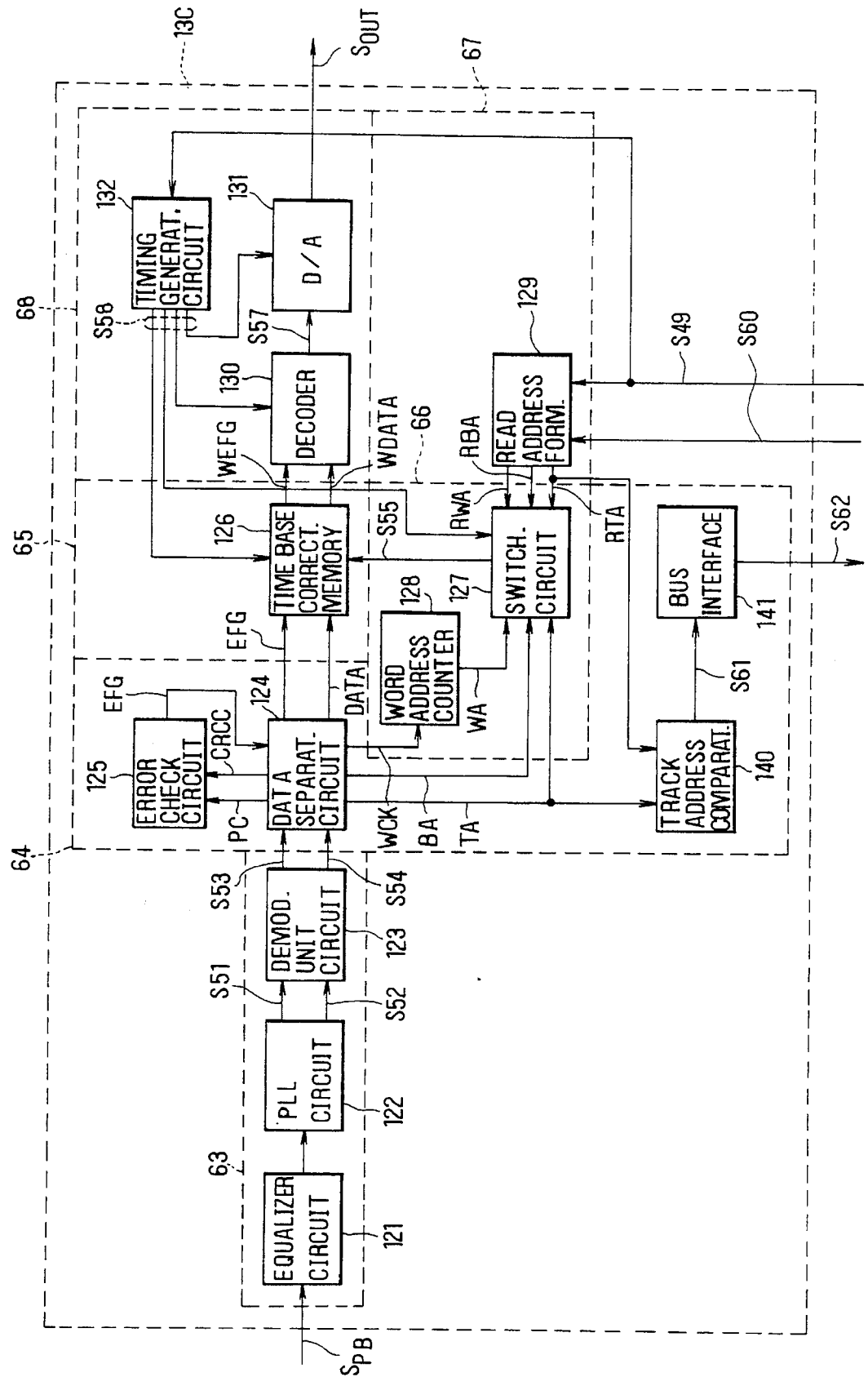

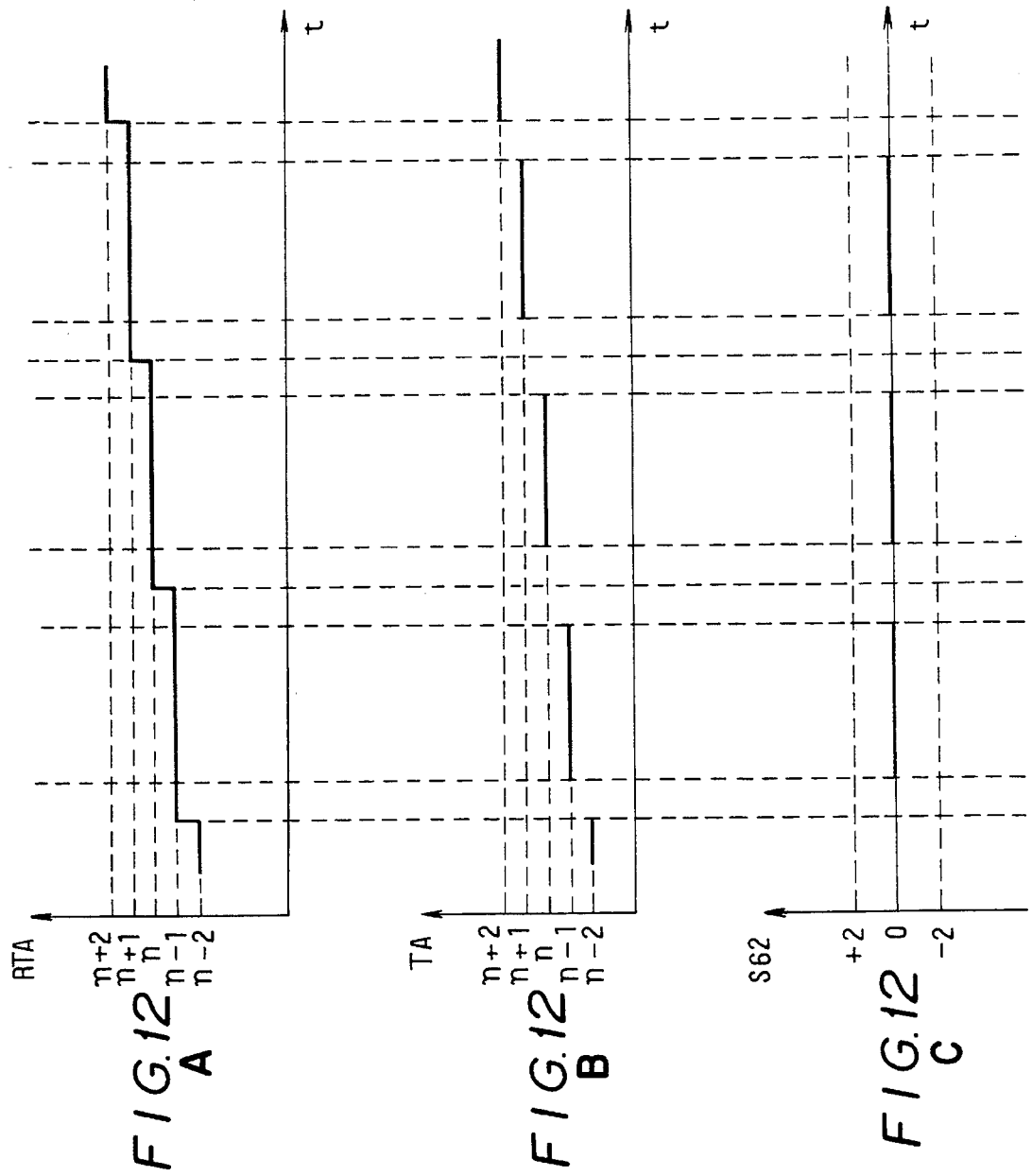

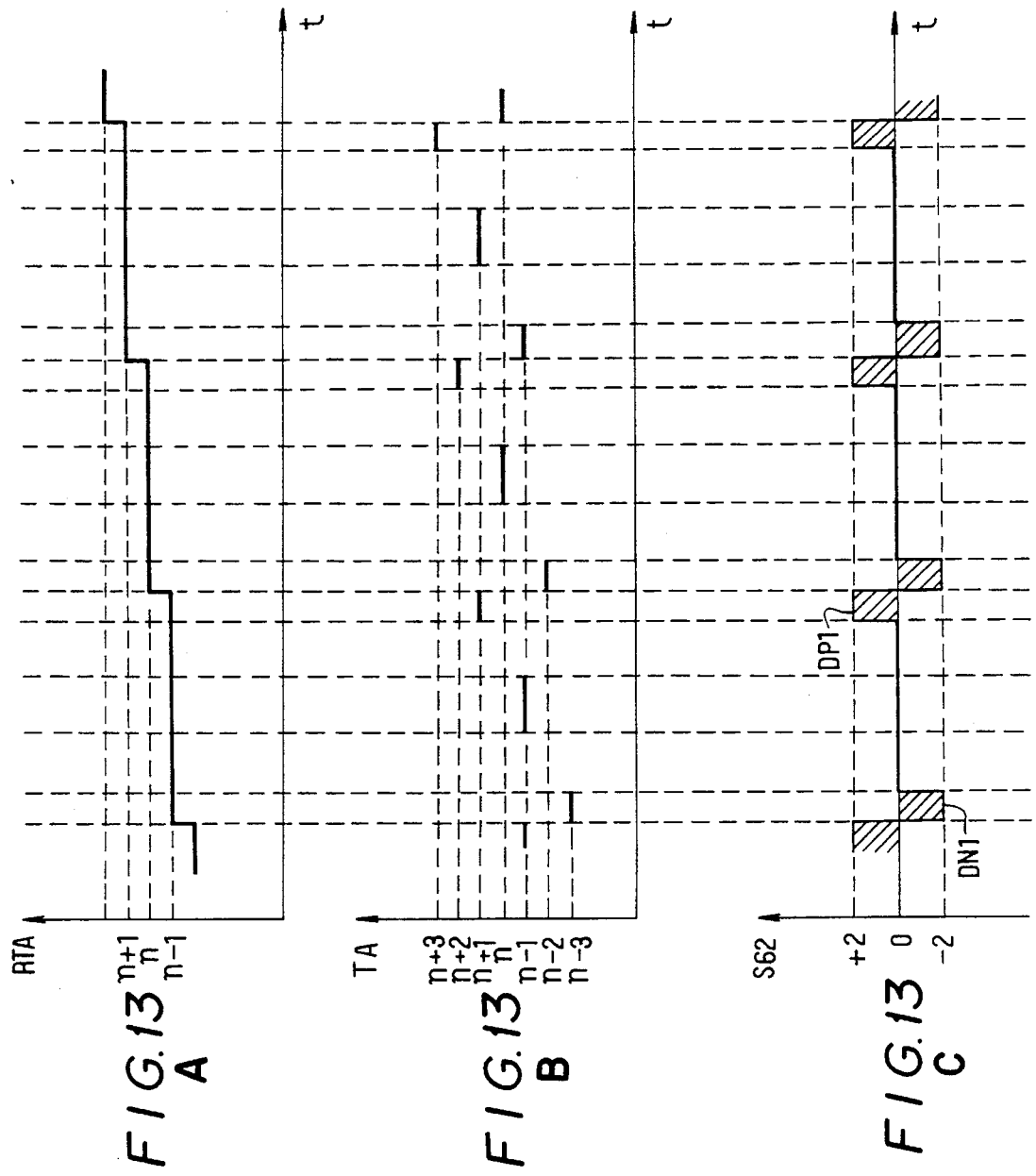

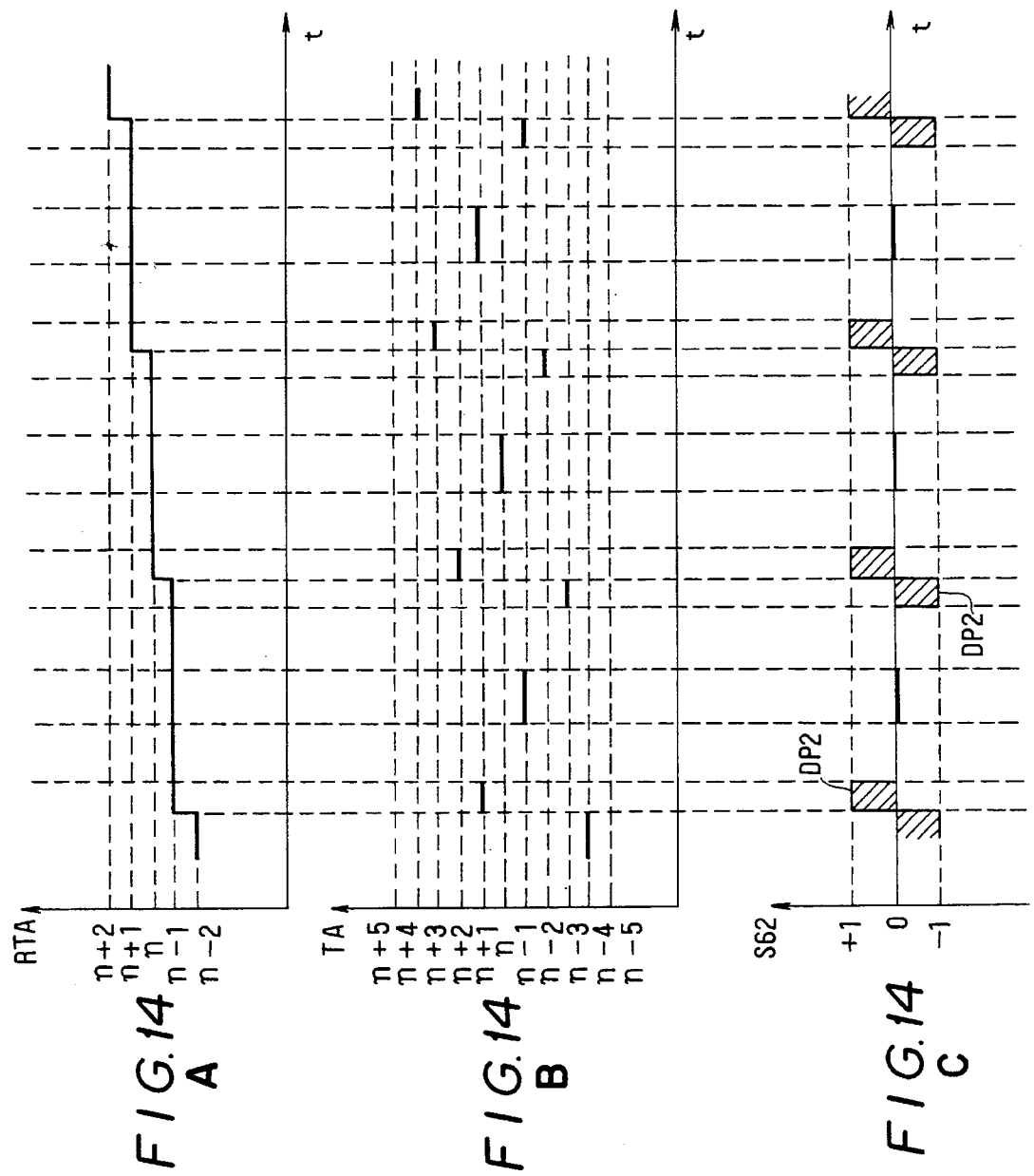

SINGLE MOTOR DRIVER FOR A HELICAL SCAN RECORDING/REPRODUCING DEVICE

This is a continuation of application Ser. No. 08/122,734 filed Sep. 16, 1993, which was a continuation of application Ser. No. 07/624,393 filed Dec. 7, 1990, both now abandoned.

BACKGROUND OF THE INVENTION

1. Field of the Invention

This invention relates to a rotary head recording and reproducing apparatus, and more particularly to a simplified driving device for a capstan and a rotary head.

2. Description of the Prior Art

As a rotary head recording and reproducing apparatus, there has been proposed hitherto a rotary head type magnetic tape recording and reproducing apparatus or a rotary head type videotape recorder intended for recording and reproducing a digital audio signal and/or a digital video signal. In such apparatus, a rotary magnetic head mounted on a rotary drum scans a magnetic tape employed as a recording medium. The tape is advanced in a running direction lengthwise and the rotary magnetic head scans the tape slantwise (see Japanese laid-open patent publication No. 58-208915).

This kind of rotary head recording and reproducing apparatus requires a tape loading mechanism to draw out a magnetic tape from a tape cassette, and a capstan to drive the magnetic tape around the rotary drum along a predetermined arc or wrap angle.

Such a tape recorder driving system includes two motors, one for driving the capstan and the other for driving the rotary drum.

In such a two-motor driving system, the motors are independent of each other, namely the drum motor for driving the rotary drum and the capstan motor for driving the capstan, and servocontrol of the drum motor and capstan motor is necessary to coordinate their operation. Thus, the general construction becomes complicated.

SUMMARY OF THE INVENTION

An object of this invention is to provide a remedy for the problems outlined above. In particular, an object of the invention is to provide a rotary head recording and reproducing apparatus that is simplified and can be miniaturized as compared with the driving systems of the prior art.

The foregoing and other objects are obtained in accordance with the invention by the provision of a rotary head tape recording and reproducing apparatus for recording or reproducing an information signal including address data on or from recording tracks formed on a magnetic tape across a longitudinal direction of the magnetic tape, the apparatus comprising: rotary head means; head drum means mounting the rotary head means and supporting a magnetic tape wound around the head drum means along a predetermined wrap arc, the rotary head means recording or reproducing the information signal on or from the magnetic tape; capstan means for driving the magnetic tape; transmission means connected to the head drum means and the capstan means; common motor means for driving the transmission means, the head drum means and the capstan means, at least the head drum means and the capstan means being driven in rotation; reference means for generating first and second reference signals; comparison means for comparing the first reference signal with a first output signal representing a rotational state of the rotary head means to produce a first comparison signal and for comparing the second reference signal with a second output signal representing address data reproduced from the magnetic tape by the rotary head means to produce a second comparison signal; and servo control means operative in a recording mode for controlling the common motor means in accordance with the first comparison signal and in a reproducing mode for controlling the common motor means in accordance with the second comparison signal.

The nature, principle and utility of the invention will become more apparent from the following detailed description when read in conjunction with the accompanying drawings, in which like parts are designated by like reference numerals or characters.

BRIEF DESCRIPTION OF THE DRAWING

In the accompanying drawings:

FIG. 7A, FIG. 7B, FIG. 8 and FIG. 9 are block diagrams showing a detailed construction of the embodiment;

FIG. 12A, FIG. 12B, FIG. 12C, FIG. 13A, FIG. 13B, FIG. 13C, FIG. 14A, FIG. 14B and FIG. 14C are signal waveform diagrams serving for illustration of a servo operation for drawing scanning paths SCN1 to SCN3 of FIG. 11.

DESCRIPTION OF THE PREFERRED EMBODIMENTS

Preferred embodiments of this invention will be described with reference to the accompanying drawings.

(1) Apparatus to which the Invention can be Applied

Figure 1:
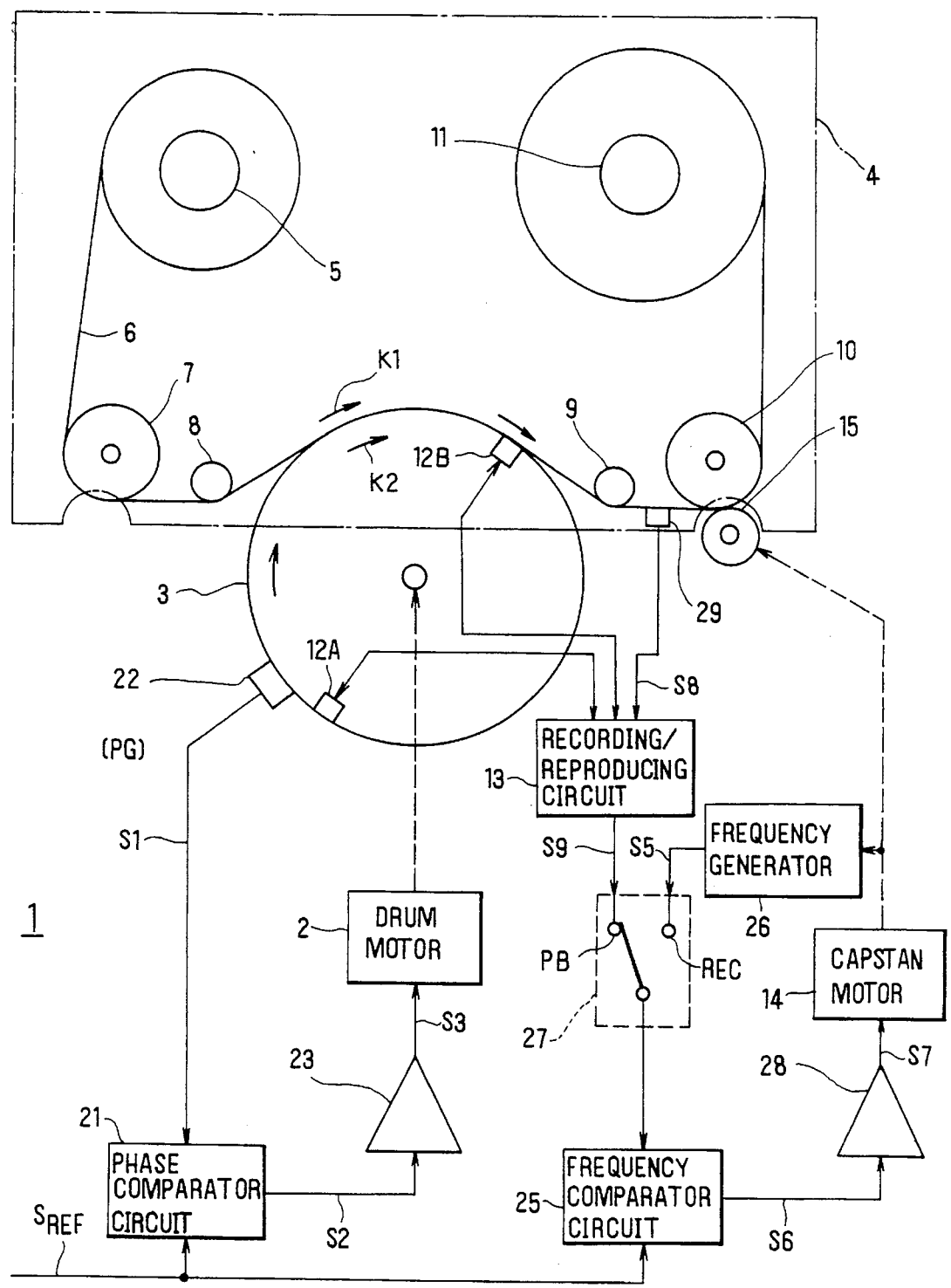
FIG. 1 and FIG. 2 are block diagrams showing rotary head recording and reproducing apparatus constructed for trial before the present invention and typical of apparatus to which the present invention can be applied.
Figure 2:
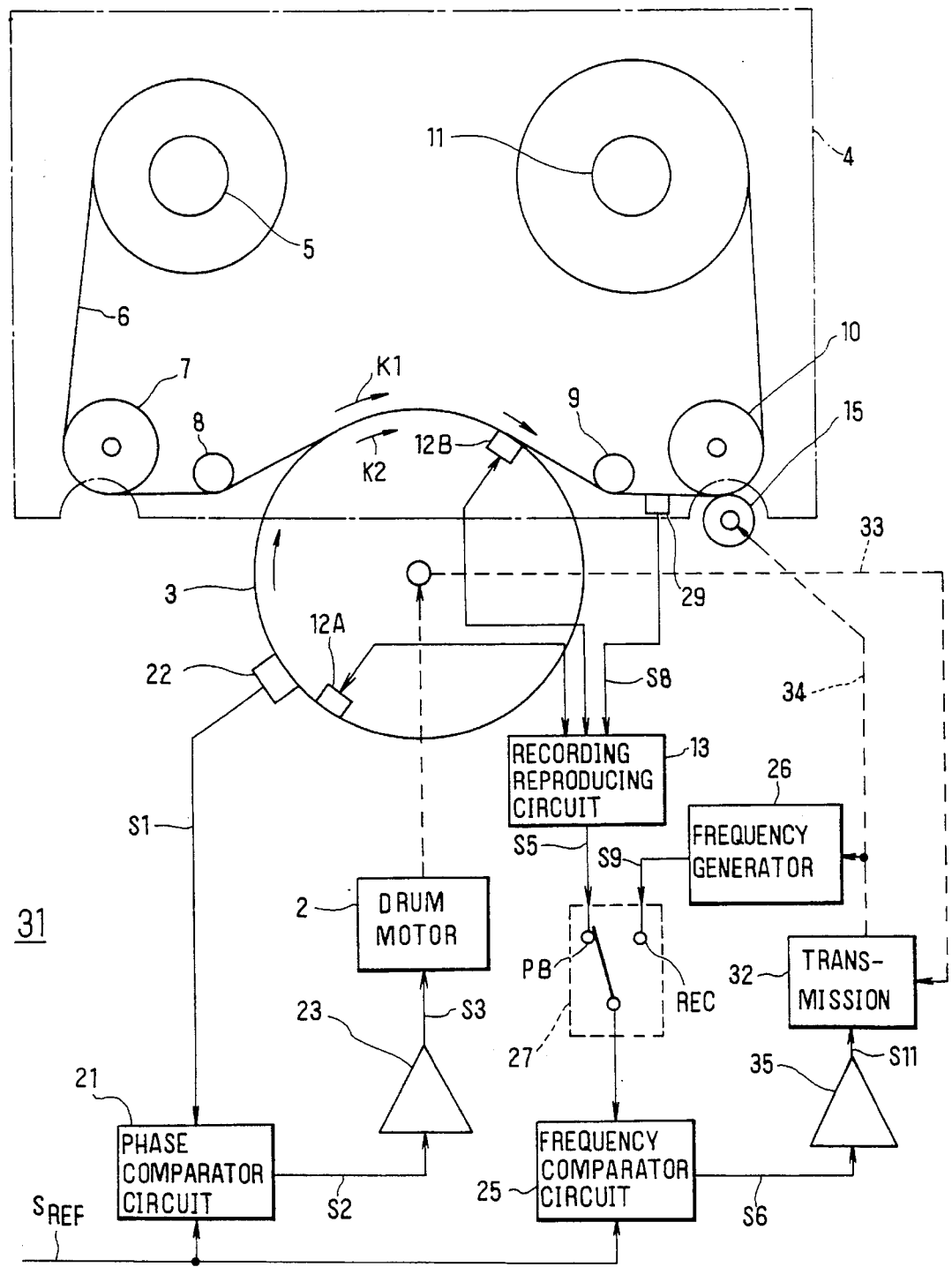

The present invention can be applied to recording and reproducing apparatus shown by way of example in FIGS. 1 and 2.

In a two-motor driving device 1 shown in FIG. 1, a magnetic tape 6 from a feed reel 5 of a tape cassette 4 is threaded around a rotary drum 3 driven by a drum motor 2 to a take-up reel 11. The magnetic tape 6 also passes around a pinch roller 7 and a guide roller 8 positioned on one side of the rotary drum 3 and a guide roller 9 and a pinch roller 10 positioned on the other side of the rotary drum 3.

The magnetic tape 6 runs helically in a direction generally indicated by an arrow K1 around the rotary drum 3, and a pair of rotary magnetic heads 12A and 12B mounted on the rotary drum 3 rotate at high speed in the direction indicated by an arrow K2. Digital audio data supplied from a recording/reproducing circuit 13 at the time of recording is recorded on a recording track on the magnetic tape 6, and the digital audio data is picked up from the recording track at the time of reproducing and supplied as an input to the recording/reproducing circuit 13, thereby reproducing the audio signal.

A phase comparator circuit 21 is provided on a driving system of the rotary drum 3. A detection pulse signal S1 indicating a rotary phase of the rotary drum 3 is generated by a pulse generator (PG) 22. The phase is compared with the phase of a reference pulse signal $S_{REF}$ at the phase comparator circuit 21. A phase error signal S2 is supplied by the phase comparator circuit 21 to a drive amplifier circuit 23, which generates a drive output S3 for adjusting the drum speed in such a manner as to remove the phase difference from the signal supplied to the drum motor 2.

Thus the rotary drum 3 is rotated and driven at a rotary phase synchronized with the reference pulse signal $S_{REF}$.

A frequency comparator circuit 25 is provided in a driving system for a capstan 15. A frequency detection signal S5 is a pulse signal indicating the rotational speed of the capstan 15 and is generated by a frequency generator (FG) 26. The signal S5 is provided to the frequency comparator circuit 25 through a switching input terminal REC of a switching circuit 27 during recording, so that the frequency is compared with the frequency of the reference pulse signal $S_{REF}$. A frequency error signal S6 indicating the frequency deviation is provided to a drive amplifier circuit 28.

The drive amplifier circuit 28 supplies a drive output S7 to a capstan motor 14. Thus the rotational speed of the capstan 15, and accordingly the running speed of the magnetic tape 6, are controlled to a value determined by the frequency of the reference pulse signal $S_{REF}$ at the time of recording. That is, the tape running speed is adjusted by the capstan 15 in such a manner as to eliminate any frequency error indicated by the signal S6.

During playback, a control signal (CTL signal) S8 recorded on the magnetic tape 6 is picked up by a fixed magnetic head 29, and thus a tape feed signal S9 comprising a pulse signal indicating the running state of the magnetic tape 6 is provided to the frequency comparator circuit 25 through a switching input terminal PB of the switching circuit 27 during playback. The frequency comparator circuit 25 controls the rotational speed of the capstan 15 so as to synchronize the running state of the magnetic tape 6 with the reference pulse signal $S_{REF}$.

In the system described above, the two motors 2 and 14 are independent of each other. Thus the drum motor 2 and the capstan motor 14 respectively provided for driving the rotary drum 3 and the capstan 15 must be subjected to a servo operation by means of separate servo systems. The structure is therefore complicated and expensive.

A one-motor driving device 31 shown in FIG. 2 may be considered for solving the aforementioned problem. Parts of FIG. 2 corresponding to those of FIG. 1 are indicated by the same reference characters. An electromagnetic brake type transmission gear 32 is provided instead of the capstan motor 14 of FIG. 1 and the drive amplifier circuit 28 for driving it. The rotation of the rotary drum 3 is coupled to an input shaft of the electromagnetic brake type transmission device 32 through a belt 33. An output shaft 34 is coupled to the capstan 15. The frequency error signal S6 of the frequency comparator circuit 25 is thus transformed into a drive output S11 at a drive amplifier circuit 35. A brake torque of the electromagnetic brake type transmission device 32 is then controlled by the drive output S11 to modify the slippage of the belt 33, thus synchronizing the rotational speed of the output shaft 34 with the reference pulse signal $S_{REF}$.

According to the construction illustrated in FIG. 2, the capstan motor 14 (FIG. 1) can be replaced by the electromagnetic brake type transmission device 32 (FIG. 2) as compared with the construction of FIG. 1, thereby reducing the size of the apparatus.

However, the structure of FIG. 2 is still not satisfactory for practical use in a case where the structure must further be miniaturized.

The present invention provides a rotary head recording and reproducing apparatus that can be miniaturized and simplified further as compared with driving systems such as those shown in FIGS. 1 and 2.

(2) First Embodiment

Figure 3:
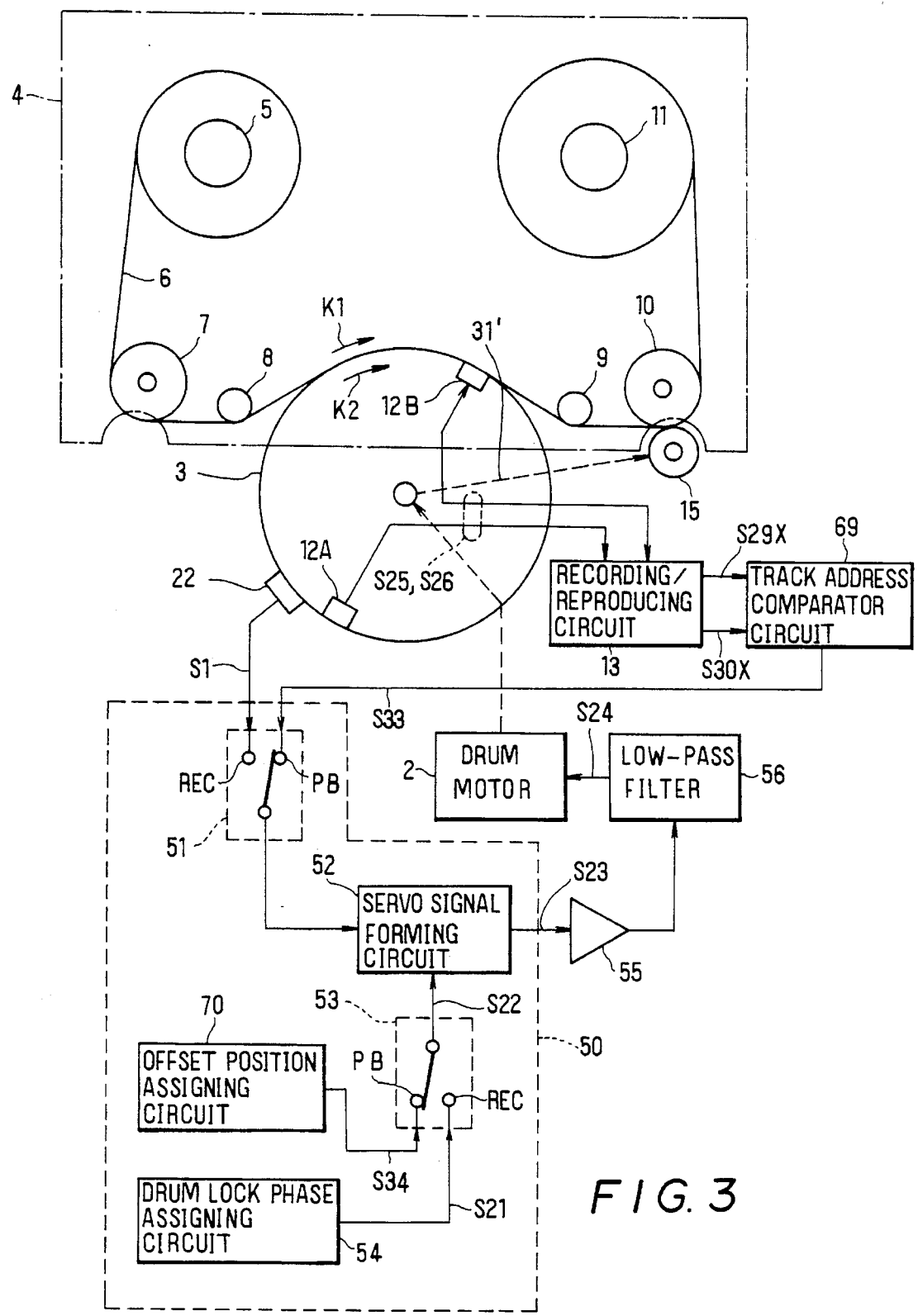
FIG. 3 is a block diagram representing one embodiment of a rotary head recording and reproducing apparatus according to this invention.

Parts of FIG. 3 corresponding to those of FIGS. 1 and 2 are identified by the same reference characters. In FIG. 3, a rotational torque or a turning force applied to the rotary drum 3 by the drum motor 2 is transferred to the capstan 15 by a driving gear 31'. The capstan 15 is thus driven at a speed reduced in accordance with the overall gear ratio of the driving gear 31' to a rotational speed appropriate to that of the rotary drum 3.

Figure 4:
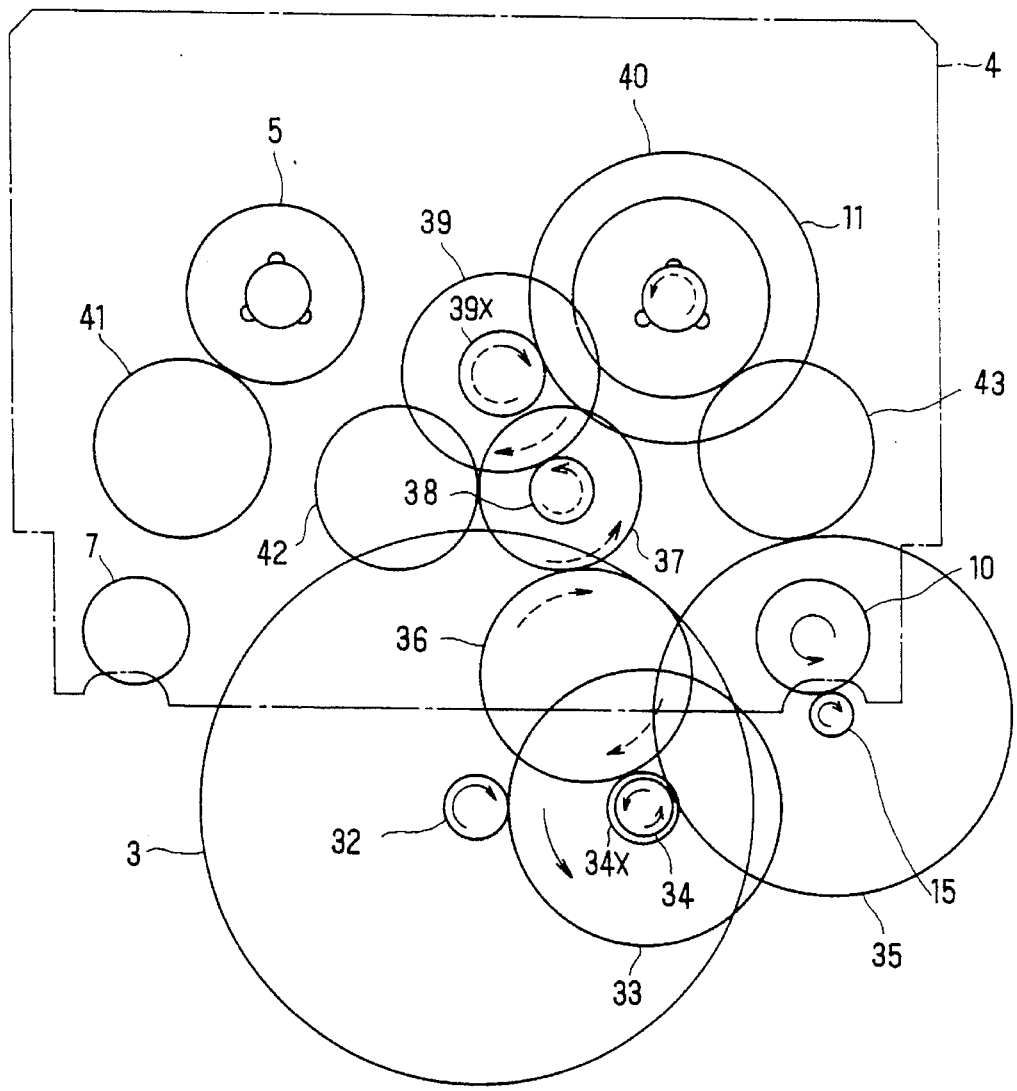
FIG. 4 is a schematic diagram showing an apparatus in the embodiment of FIG. 3 for driving a rotary drum and a capstan.

In this embodiment, the driving gear 31' shown schematically in FIG. 3 has, as FIG. 4 shows, a motor pinion gear 32 rotated integrally with the rotary drum 3. The motor pinion gear 32 engages the capstan gear 35, rotating integrally with the capstan 15 through the relay gears 33, 34 having a predetermined reduction ratio.

Further, in this embodiment, the relay gear 34 engages a take-up reel gear 40 rotating integrally with the take-up reel 11 through relay gears 34X, 36, 37, 38, 39, 39X in that order, thereby taking up the magnetic tape 6.

A rewind idler gear 41 is interposed between a coupling gear 42 engaging the relay gear 37 in the rewind mode and the reel base of the supply or feed reel 5. A quick-traverse idler gear 43 couples the relay gear 37 and the reel base of the take-up reel 11 during the quick-traverse or fast-forward mode. When the tape cassette 4 is reversed so that it is upside down relative to an orientation in which the pinch roller 7 comes in contact with the capstan 15, the pinch roller 10 instead of 7 comes in contact with the capstan 15, so that the magnetic tape 6 can be played in either direction.

The phase detection signal S1 (FIG. 3) obtained from the pulse generator 22 during recording is provided to an input terminal REC of a switching circuit 51 of a servo signal processing circuit 50. From there, it passes to a servo signal forming circuit 52, which generates a servo output signal S23. The servo output signal S23 corresponds to a servo phase setting signal S22 derived from a lock phase assigning signal S21. The signal S21 is generated by a drum lock phase assigning circuit 54 and supplied through a switching input terminal REC of a switching circuit 53 during recording. The servo output signal S23 is transformed into a direct current drive output signal S24 through a drive amplifier circuit 55 and a low-pass filter 56. The drive output signal S24 is supplied to the drum motor 2.

Figure 5:
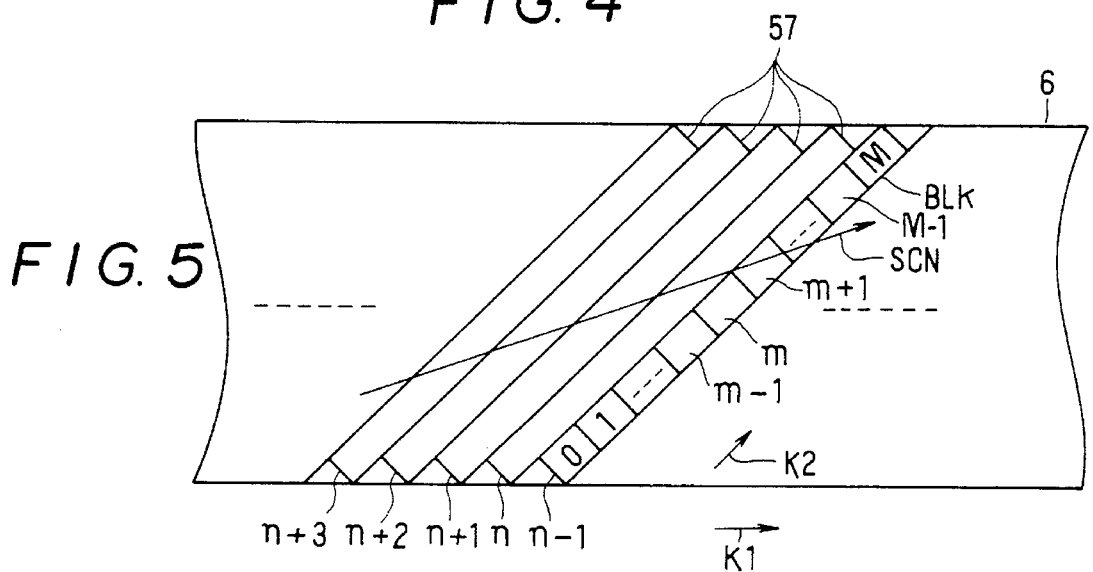
FIG. 5 is a diagrammatic developed plan view showing a scanning path on a magnetic tape.

Thus in the recording mode, the servo signal processing circuit 50 drives the rotary drum 3 in rotation in a state locked to a phase corresponding to the lock phase assigning signal S21, and also drives the capstan 15 in rotation at a speed dictated by the reduction ratio of the driving gear train 31' and corresponding to the rotational speed of the rotary drum 3. As a result, as FIG. 5 shows, a signal provided by the recording/reproducing circuit 13 of FIG. 3 is recorded slantwise on the magnetic tape 6 by the magnetic heads 12A and 12B. The magnetic heads 12A and 12B scan in a head scanning direction K2 (FIG. 5) slantwise with respect to the tape 6. The recording tracks 57 are formed in abutting relation to each other successively in the tape running direction K1.

In this embodiment, track addresses . . . n−1, n, n+1 . . . are assigned to the recording tracks 57 (FIG. 5). Each of the recording tracks 57 of the track addresses . . . n−1, n, n+1 . . . is divided into blocks BLK with block addresses . . . m−1, m, m+1 . . . assigned in the head scanning direction K2. Address data indicating the track address n (n=. . . n−1, n, n+1 . . . ) and block data indicating the block address m (m=. . . m−1, m, m+1 . . . ) are recorded in each block BLK together with information data. Thus when the rotary magnetic heads 12A, 12B scan each block BLK in the reproducing mode, the track address and the block address are supplied to the recording/reproducing circuit 13 as a pick-up signal S26 (FIG. 6) together with the information data.

Figure 6:
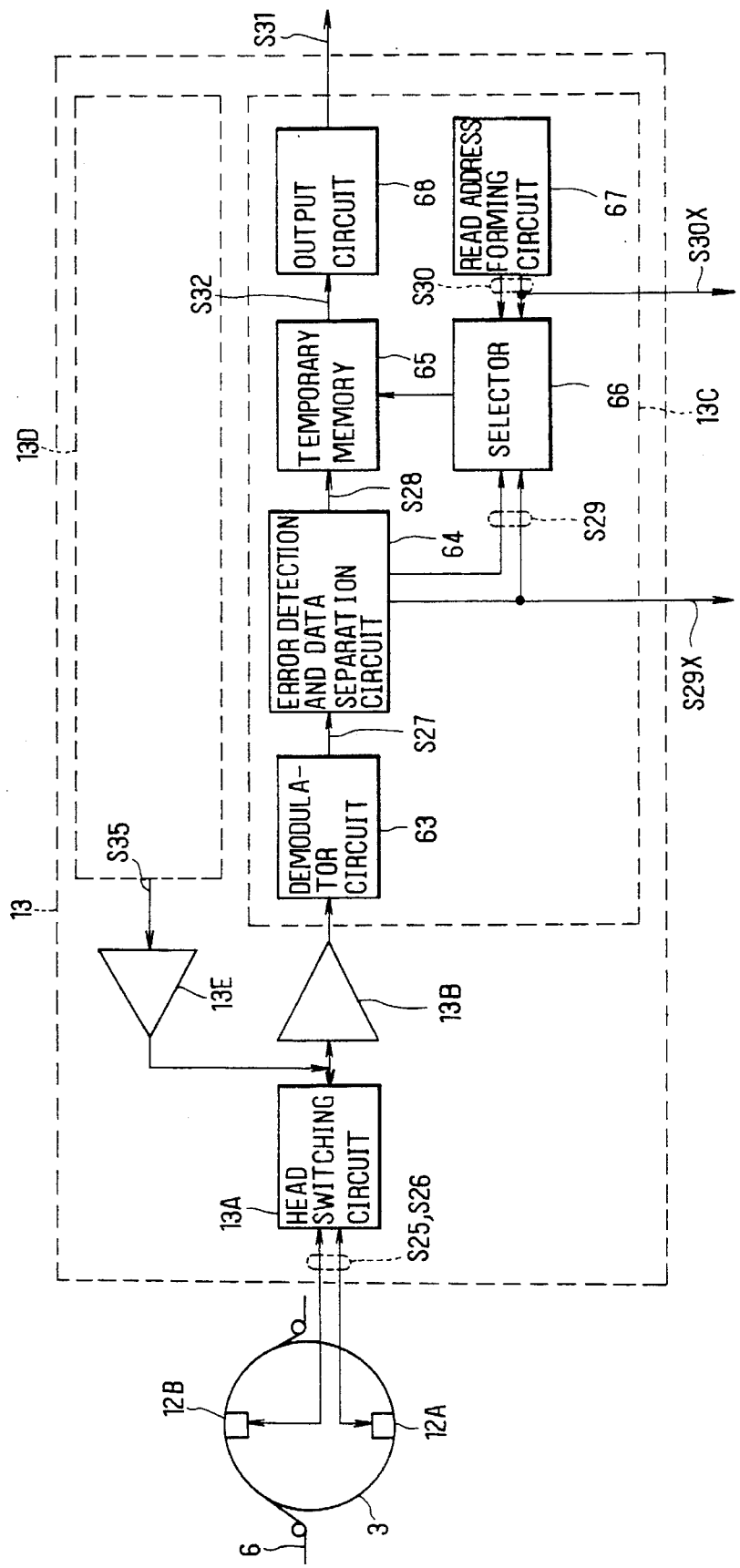
FIG. 6 is a block diagram showing a concrete configuration of a recording/reproducing circuit.

As FIG. 6 shows, in the recording mode the recording/ reproducing circuit 13 supplies a recording data signal S35 obtained from a recording signal processing circuit 13D to the rotary magnetic heads 12A and 12B as the recording signal S25 through a recording amplifier circuit 13E and a head switching circuit 13A.

The recording/reproducing circuit 13 supplies the pickup signal S26 coming from the rotary magnetic heads 12A, 12B in the reproducing mode to a demodulator circuit 63 through the head switching circuit 13A and a reproducing amplifier circuit 13B in that order, and provides the demodulated data output S27 to an error detection and data separation circuit 64.

The error detection and data separation circuit 64 sends the information data S28 including error detection information to a temporary memory 65 for TBC (time base correction) by means of audio data and an error detection code signal included in the demodulation data output S27. The circuit 64 also provides a write address data signal S29 comprising the track address n and the block address m to the temporary memory 65 through a selector 66. An information data signal S28 is written in the memory address assigned by the track address n and the block address m.

Thus when the rotary magnetic heads 12A, 12B supply the pickup signal S26, every block BLK (FIG. 5) is reproduced and stored in the temporary memory 65.

A read address data signal S30 is formed by a read address forming circuit 67 and supplied to the temporary memory 65 through the selector 66, and the information data stored in the temporary memory 65 are read from the data of the first block successively at a predetermined data transmission rate at every track address n (n=. . . n−1, n, n+1 . . . ). As a result, the temporary memory 65 generates a reproducing output signal S32 comprising information data S28 corrected for time base errors. The data thus read out and corrected are sent as the reproduced output signal S31 through an output circuit 68 comprising a digital/analog converter circuit (not shown in FIG. 6).

In this embodiment, since a track servo system is not provided for controlling the capstan 15, the rotary magnetic heads 12A, 12B effectively run, as indicated by a scanning path SCN in FIG. 5, according to a scanning system (called a non-tracking system) such as will permit scanning across a plurality of the recording tracks 57 between a running-in point and a breakaway point. (The rotary magnetic heads 12A, 12B make contact with the magnetic tape 6 at a running-in-point and scan the magnetic tape 6 to a breakaway point, where they leave the magnetic tape 6.)

If the rotary magnetic heads 12A, 12B scan on the scanning path SCN, then the scan path crosses the recording tracks successively in the order of track addresses . . . n+1, n, n−1 . . . , and scan the blocks BLK in the order of block addresses m=0, 1 . . . m−1, m, m+1 . . . M−1, M.

Accordingly, the write address data S29 obtained from the error detection and data separation circuit 64 has a content increasing continuously as the track address n and the block address m, and the content of the track address n of the write address data S29 indicates a scanning position while the rotary magnetic heads 12A, 12B scan the magnetic tape 6.

Thus track address data (comprising an upper bit portion of demodulation data output S27) indicating the track address n of the write address data S29 is provided to a track address comparator circuit 69 (FIG. 3) from the recording/ reproducing circuit 13 as a scanning position detection signal S29X.

In addition, track address data corresponding to the read address data S30 supplied by the read address forming circuit 67 in the recording/reproducing circuit 13 (FIG. 6) is provided to the track address comparator circuit 69 as a scanning position reference signal S30X (FIG. 3). The track address comparator circuit 69 generates an address difference detection signal S33. The signal S33 indicates the differential address between a reference track address assigned by the scanning position reference signal S30X and a detection track address of the recording track scanned concurrently, which is indicated by the scanning position detection signal S29X. The signal S33 is provided to the servo signal forming circuit 52 by way of a switching input terminal PB of the switching circuit 51 (FIG. 3) during playback. A servo output signal S23 corresponding in magnitude to the address difference is supplied by the servo signal forming circuit 52.

In the playback mode, an offset position assigning signal S34 of an offset position assigning circuit 70 is supplied to the servo signal forming circuit 52 through an input terminal PB of a switching circuit 53. The servo output S23 thus indicates a head scanning position offset relative to the position indicated by the signal S33 by the offset position assigning signal S34. The rotary magnetic heads 12A and 12B are thus in a servo controlled state to scan the magnetic tape 6 as set to a scanning position assigned by the offset position assigning signal S34.

In the recording mode of the structure described above, the drum motor 2 (FIG. 3) operates to rotate the rotary drum 3 in such a manner that the phase detection signal S1 obtained from the pulse generator 22 coincides in phase with the lock phase assigning signal S21 of the drum lock phase assigning circuit 54 (i.e., the circuit 54 for assigning the lock phase angle of the drum 3), and the capstan 15 is driven in rotation at a predetermined reduction ratio with respect to the rotary drum 3. Thus, the rotary magnetic heads 12A, 12B scan in the head scanning direction K2 at a rotary phase assigned by the look phase assigning signal S21 and also at a predetermined rotational speed, the magnetic tape 6 is run at the same time at a speed determined by a gear ratio of the driving gear 31, and finally the recording tracks 57 are formed on the magnetic tape 6.

During playback, the address difference detection signal S33 obtained from the recording/reproducing circuit 13 in accordance with the pick-up signal S26 of the rotary magnetic heads 12A, 12B is offset by the offset position assigning signal S34, and the drum motor 2 is in a servo-controlled operating state wherein the rotary magnetic heads 12A and 12B scan the track address position offset by an offset track address indicated by the offset position assigning signal S34. The heads 12A and 12B are offset to an address indicated by the read address data S30, and the capstan 15 operates so as to interlock with the rotary drum 3 at a rotational speed determined by the reduction gear ratio of the driving gear 31.

If the track address S30X of the read address data S30 of the read address forming circuit 67 (FIG. 6) increases, then the rotary magnetic heads 12A and 12B are controlled to scan a track address position displaced by the offset position assigning signal S34, and thus audio recording data are read out of all the blocks BLK of the recording tracks 57 formed on the magnetic tape 6 and can be written in the temporary memory 65.

In such state the rotary drum 3 rotates stably at a speed following the scanning position reference signal S30X, and the capstan 15 also rotates stably. Thus, even if the rotary head recording and reproducing apparatus becomes oscillatory as a whole, a track pitch and a scanning pitch will not fluctuate (the speed ratio of the rotary drum 3 and the capstan 15 is constant).

Accordingly, as indicated by the scanning path SCN in FIG. 5, the rotary magnetic heads 12A and 12B operate to reproduce recording data on the recording tracks 57 while shifting their scanning position sequentially in such a direction as to coincide with the tape running direction K1 and as to maintain a predetermined angle of inclination with respect to the recording tracks 57.

In accordance with the construction described above, a common driving motor is provided for driving the rotary drum 3 and the capstan 15, and a single servo system suffices to control the driving motor. Therefore, a driving system that is simplified and miniaturized as compared with the prior art is realizable. Moreover, the recording and reproducing of information data on and from the magnetic tape undergoes no deterioration as compared to the prior art.

(3) Concrete Construction of the Embodiment

The rotary head recording and reproducing apparatus described above with reference to FIG. 3 to FIG. 6 is realized by a concrete construction shown in FIG. 7A to FIG. 10C, wherein corresponding parts are represented by the same reference characters.

Figure 7A:
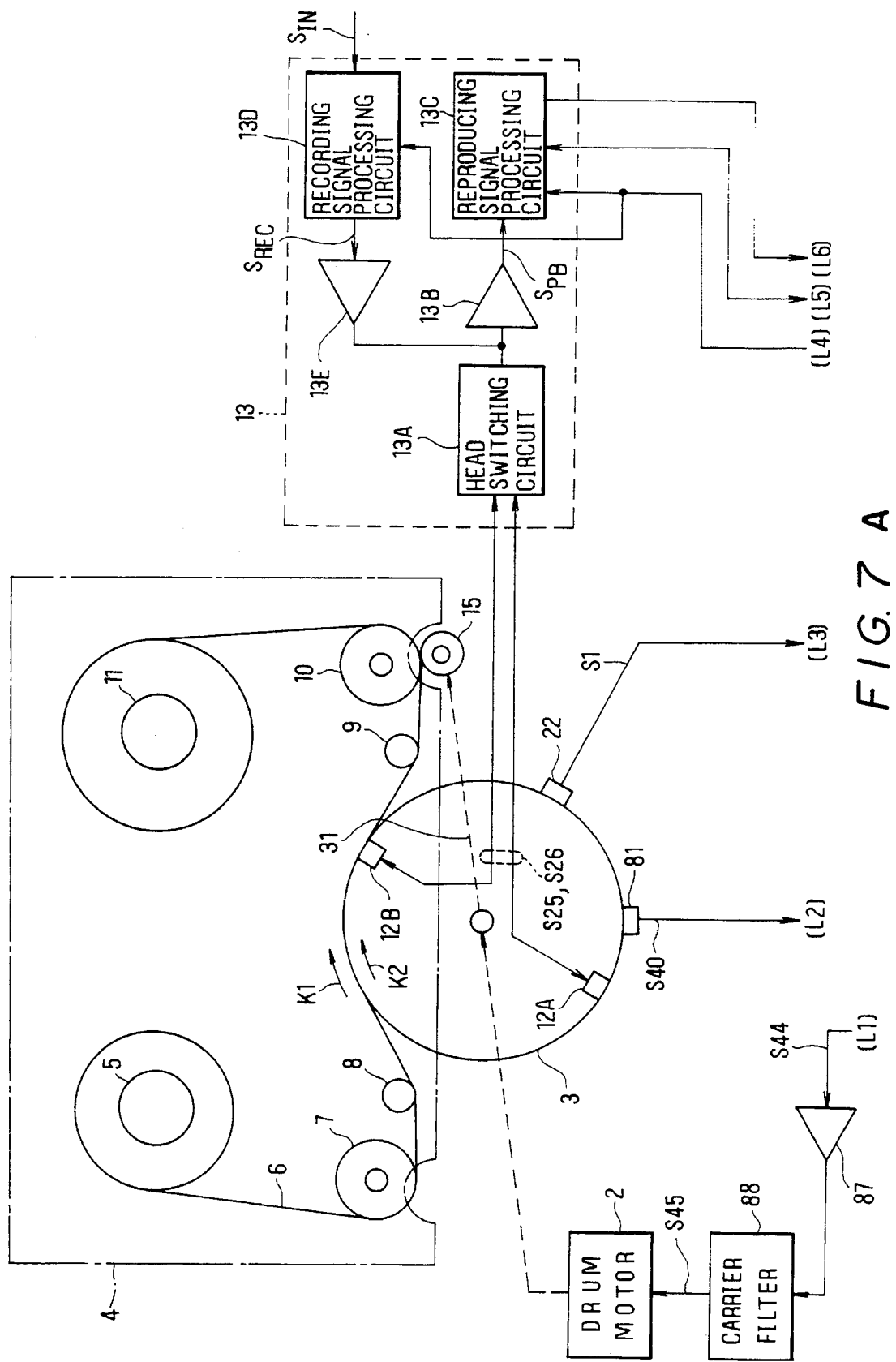
Figure 7B:
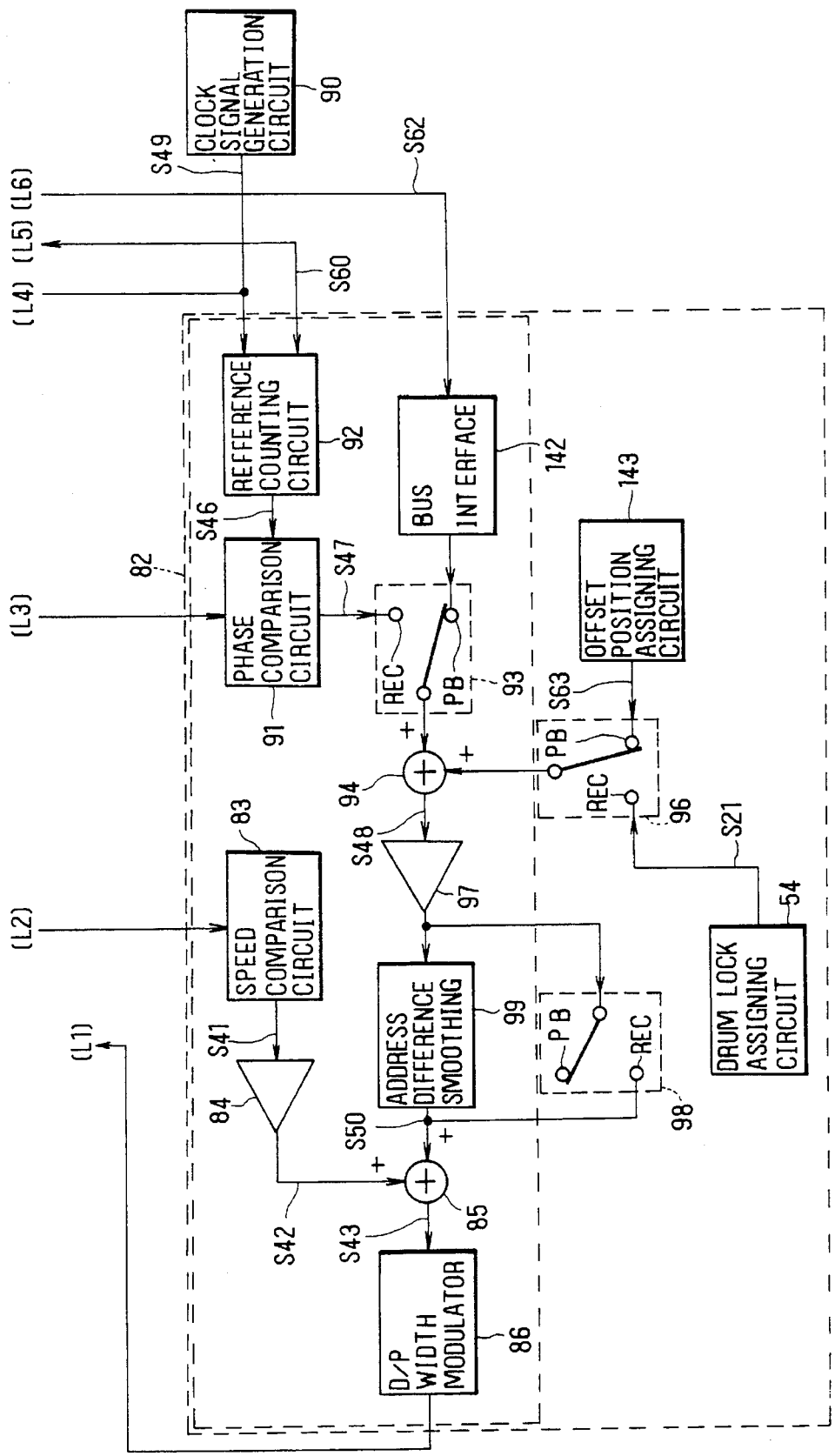

A speed detection signal S40 (FIG. 7A) produced by a frequency generator (FG) 81 coupled to a rotating shaft of the rotary drum 3 is supplied to a speed comparison circuit S3 (FIG. 7B). The speed comparison circuit 83 generates speed detection data S41 indicating any deviation from a predetermined reference speed and supplies it as speed data S42 to an addition circuit 85 through a speed gain circuit 84. An addition output S43 of the addition circuit 85 is supplied to a digital/pulse width modulator circuit 86.

The digital/pulse width modulator circuit 86 modulates the width of a carrier pulse having a predetermined carrier frequency (for example 256 kHz) to a duty ratio corresponding to a digital numeric value indicated by the addition output S43 and supplies it to a drive amplifier circuit 87 (FIG. 7A) and a carrier filter 88 as a servo output signal S44. The signal S44 is transformed to a direct current in the carrier filter 88 and supplied to the drum motor 2 as a drive output S45, thereby driving the rotary drum 3 at a predetermined reference speed.

The phase detection signal S1 obtained from the pulse generator 22 (FIG. 7A) is provided to a phase comparison circuit 91 (FIG. 7B) of a servo signal processing circuit 82. The phase comparison circuit 91 samples a reference phase counting signal S46 obtained from a reference counting circuit 92 according to the phase detection signal S1 and supplies detection phase data S47 indicating the difference between the rotary phase of the rotary drum 3 and the counting phase of the reference counting circuit 92. The phase detection data S47 is supplied to an addition circuit 94 through an input terminal REC of a switching circuit 93 during recording.

In the case of this embodiment, the reference counting circuit 92 forms the reference phase counting signal S46 by counting a clock pulse of a clock signal S49 generated by a clock signal generation circuit 90.

The lock phase assigning signal S21 generated by the drum lock phase assigning circuit 54 is provided to the addition circuit 94 through an input terminal REC of a switching circuit 96 during recording. The addition circuit 94 is thus capable of setting a lock phase of the rotary drum 3 by adjusting the detection phase data S47 according to the lock phase assigning signal S21 during recording.

As a result, position difference data S48 indicating the phase difference (indicated as a track address) with respect to a reference phase position (namely a scanning position of the rotary magnetic heads 12A, 12B on the magnetic tape 6) of the rotary drum 3 is obtained at an output terminal of the addition circuit 94. The position difference data S48 is supplied to the addition circuit 85 as position data S50 through a phase gain circuit 97 and an input terminal REC of a switching circuit 98 during recording.

In the case of this embodiment the reference phase counting circuit 92 generates a rotary phase when the rotary drum 3 rotates at a reference speed as the reference phase counting signal S46. This is represented as numeric data by counting the clock signal S49 generated by the clock signal generation circuit 90 during the period corresponding to the time during which the rotary drum 3 rotates one turn at the reference speed. The phase comparison circuit 91 samples a value of the reference phase counting signal S46 according to the phase detection signal S1 obtained from the pulse generator 22 (FIG. 7A) when the rotary drum 3 comes to a predetermined rotation position, thereby transmitting the detection phase data S47 indicating any difference between the rotary phase of the rotary drum 3 and the reference phase counting signal S46.

The drum lock phase assigning circuit 54 assigns one of the count values included in the counting width of the reference phase counting signal S46 as a drum lock phase, thus obtaining data indicating any deviation between the rotary phase of the rotary drum 3 during recording and the drum lock phase. Any such difference is locked as the position difference data S48.

As a result, in a state where the rotary drum 3 is rotated and driven at a rotational speed corresponding to the speed data S42 obtained from the speed detection circuit 83, the drum motor 2 drives the rotary drum 3 so as to obtain a servo operating state where the value of the phase data S50 becomes "0". Thus the rotary phase of the rotary drum 3 will be locked to a phase shifted in accordance with the track address of the lock phase assigning signal S21.

Figure 8:
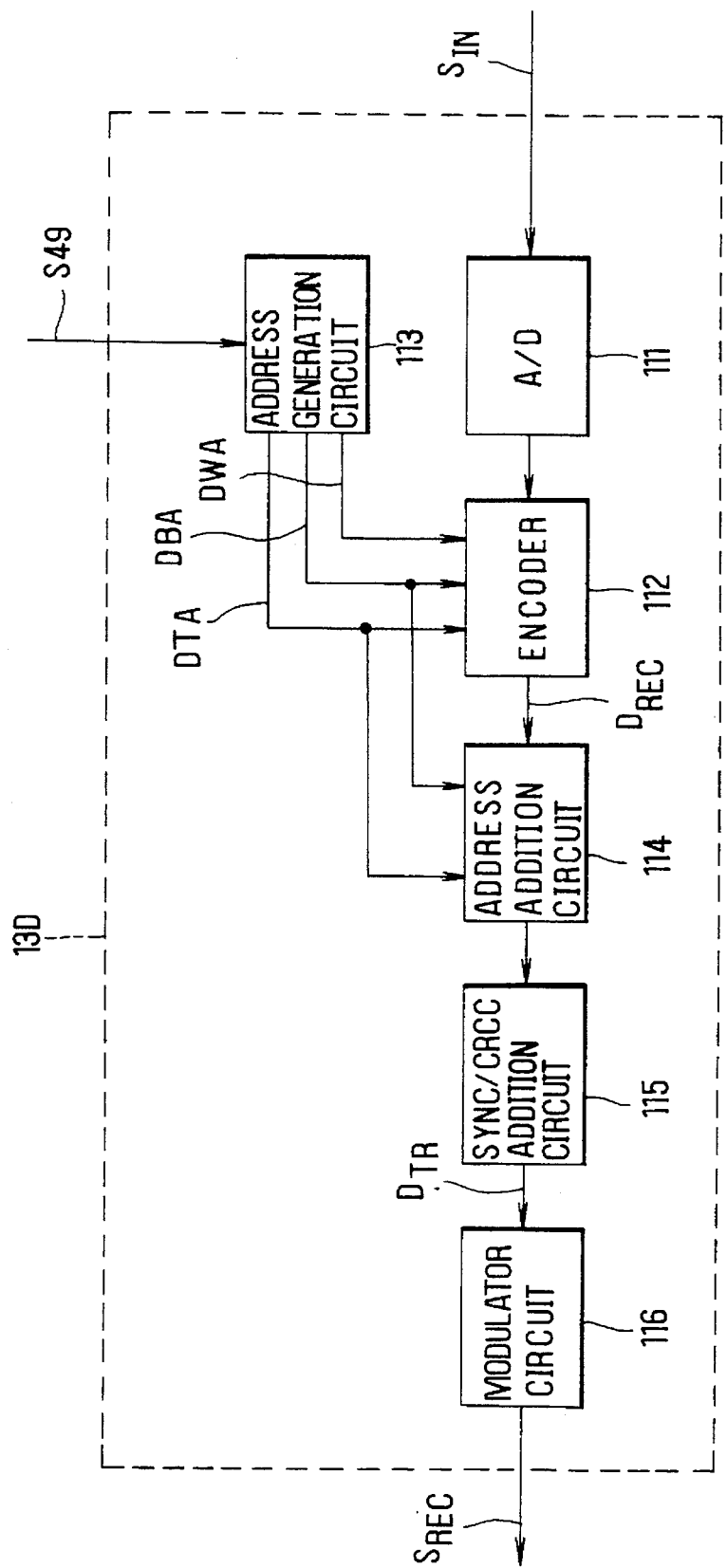

As FIG. 8 shows, the recording signal processing circuit 13D of the recording/reproducing circuit 13 receives a recording audio signal $S_{IN}$ in an encoder 112 through an analog/digital converter circuit 111, and encodes it as synchronizing with track address data DTA, block address data DBA and word address data DWA generated in an address generation circuit 113. The address generation circuit 113 is timed by the clock signal S49.

In an address addition circuit 114, a track address TA and a block address TB are added to audio data $D_{REC}$ generated in the encoder 112. The track address TA and block address TB are obtained from the track address data DTA and the block address data DBA. A synchronizing signal SYNC and an error correction code CRCC are added in a synchronizing signal/error correction code (SYNC/CRCC) addition circuit 115 subsequently thereto. The circuit 115 supplies a track data output $D_{TR}$ to a modulator circuit 116, and recording outputs $S_{REC}$ thus obtained from the modulator circuit 116 are supplied to the rotary magnetic heads 12A and 12B alternately as the recording signals S25, S26 from the recording signal processing circuit 13D through the recording amplifier circuit 13E and the head switching circuit 13A (FIG. 7A).

Thus the track data $D_{TR}$ are recorded successively on the recording tracks 57 (FIG. 5) by the rotary magnetic heads 12A and 12B.

In the case of this embodiment the track data $D_{TR}$ comprise a predetermined number of block data BL0, BL1 ... BLM successively, as shown in FIG. 10A, on every recording track 57.

Each of the block data BLm (m=0, 1 ... M) comprises, as FIG. 10B shows, successive synchronizing data SYNC, address data AD, parity check data PC, audio data DATA and error correction code data CRCC. In the case of this embodiment the synchronizing data SYNC and the address data AD comprise data for one word each, the parity check data PC comprise data PC1 to PC4 for four words for detecting errors of the synchronizing data SYNC and the address data AC, the audio data DATA comprise data for 16 words, and the error correction code data CRCC comprise data CRCC1 and CRCC2 for two words for correcting errors of the synchronizing data SYNC to the audio data DATA.

Figures 10A, 10B, 10C:
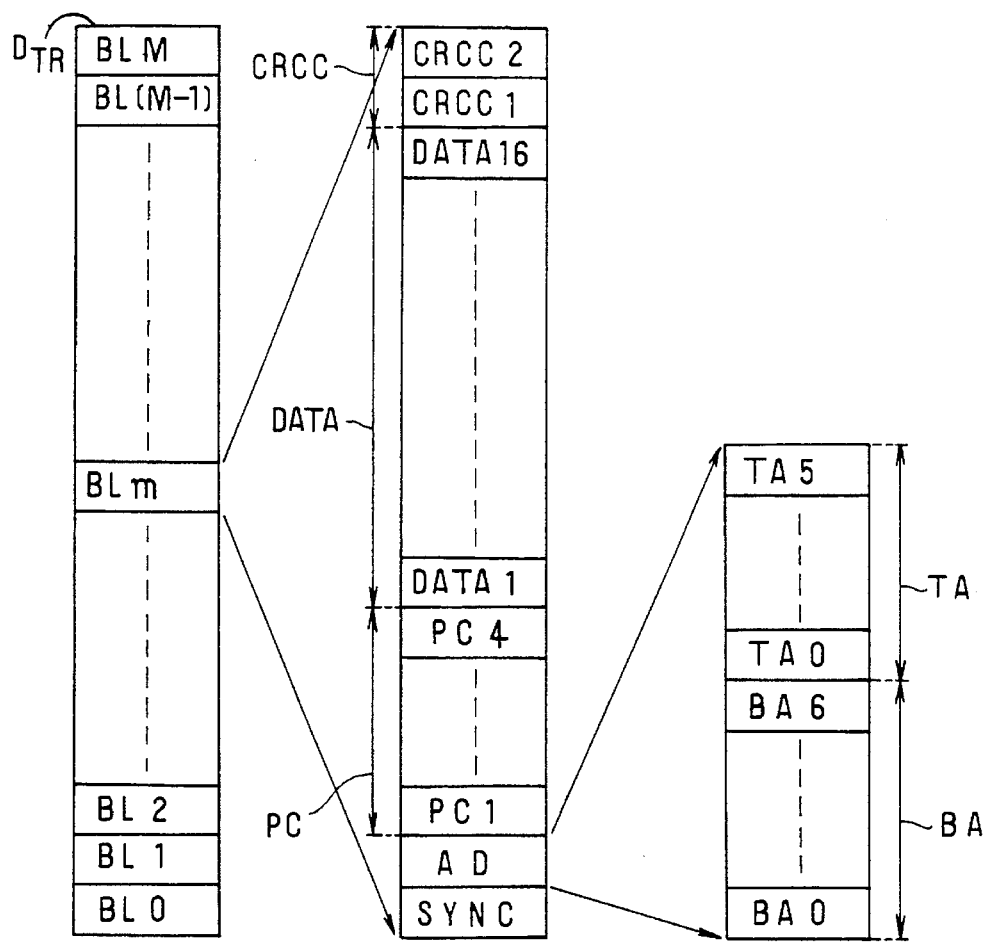
FIG. 10A, FIG. 10B and FIG. 10C are schematic diagrams showing a format of track data.

The address data AD added to the block data BLm (m=0 to M) comprises, as FIG. 10C shows, track address data TA indicating the track address n of the recording tracks 57 (FIG. 5) on which the block data BLm are recorded, and block address data BA indicating the block address m of the block data BLm. In this embodiment, the block address data BA comprise word data BA0 to BA6 for seven words, and the track address data TA comprise word data TA0 to TA5 for six words.

Thus, when the block data BLm are picked up from the rotary magnetic heads 12A, 12B scanning blocks BLK on the recording tracks 57 in the reproducing mode, positions scanned by the rotary magnetic heads 12A, 12B are ensured by the track address data TA and the block address data BA.

FIG. 9 shows details of the reproducing signal processing circuit of FIG. 7A. The reproduced input $S_{PB}$ from the reproducing amplifier circuit 13B passes through an equalizer circuit 121 and a PLL (phase locked loop) circuit 122. The latter separates it into a data signal S51 and a clock signal S52, both of which are demodulated by a demodulation unit circuit 123. The circuits 121–123 together form a demodulator circuit 63.

The demodulation unit circuit 123 supplies reproducing track data S53, which is the track data $D_{TR}$ shown in FIG. 10A, to a data separation circuit 124 together with a reproducing clock signal S54 corresponding to the clock signal S52.

The data separation circuit 124 separates the parity check data PC and the error correction code data CRCC included in each data block BLm (m=0 to M) arriving as the reproduced track data S53 and supplies them to an error check circuit 125 for error detection and correction processing of the reproduced track data S53. The circuit 124 also transmits an error flag EFG to a time base correction memory 126, as occasion demands.

Thus the data separation circuit 124 supplies the audio data DATA included in the reproduced track data S53 to the time base correction memory 126, and writes it in the time base correction memory 126 according to an address signal S55 obtained from a switching circuit 127.

In this embodiment the data separation circuit 124 generates a word clock signal WCK whenever a data word of the data block BLm arrives as the reproducing track data S53, provides it to a word address counter 128 to form a word address WA to provide to the switching circuit 127, separates the block address data BA and the track address data TA from the address data AD and provides them to the switching circuit 127. The switching circuit 127 provides the word address WA, the block address BA and the track address TA to the time base correction memory 126 as the address signal S55 in the writing mode, thereby writing the audio data DATA in a memory area assigned by the address signal S55.

The audio data DATA thus written in the time base correction memory 126 is read when a read word address RWA, a read block address RBA and a read track address RTA generated in a read address forming circuit 129 are provided to the time base correction memory 126 through the switching circuit 127 as the address signal S55. The circuit 126 supplies an output to a decoder 130 as a read audio data WDATA and a read error flag WEFG.

In order to correct errors by means of the read error flag WEFG as occasion demands, the decoder 130 restores reproduced audio data S57 according to the read audio data WDATA, and then sends it as a reproduced audio signal $S_{OUT}$ through a digital/analog converter circuit 131.

In this embodiment, the clock signal S49 of the clock signal generation circuit 90 (FIG. 7B) and a reference synchronizing signal S60 obtained from the reference counting circuit 92 are received by the read address forming circuit 129 (FIG. 9) as reference signals for obtaining the reproduced audio signal $S_{OUT}$. In the latter signal, the time base is corrected through the storage of data in the time base correction memory 126. In accordance with the clock signal S49 and reference synchronizing signal S60 corresponding to the synchronizing data SYNC (FIG. 10B) of each data block BLm (FIG. 10A), the read word address RWA, the read block address RBA and the read track address RTA are generated by the read address forming circuit 129.

A timing generation circuit 132 receives the clock signal S49 and generates a timing signal S58, which is supplied to the switching circuit 127, the time base correction memory 126, the decoder 130 and the analog/digital converter circuit 131. The reproduced audio signal $S_{OUT}$ corresponding to the read audio data WDATA and the read error flag WEFG of the time base correction memory 126 is formed in accordance with the reference clock signal.

In addition, a track address comparator circuit 140 in the reproduced signal processing circuit 13C (FIG. 9) compares the track address TA separated by the data separation circuit 124 and the read track address RTA formed in the read address forming circuit 129. The track address comparator circuit 140 generates a detection address signal S61 indicating the deviation between the two input signals and sends the signal S61 through a bus interface 141 of the reproducing signal processing circuit 13C, which generates a corresponding output signal S62. The signal S62 is provided to the addition circuit 94 (FIG. 7B) through a reproducing input terminal PB of the switching circuit 93 by way of a bus interface 142 of the servo signal processing circuit 82.

An offset position signal S63 (FIG. 7B) generated by an offset position assigning circuit 143 is supplied to the addition circuit 94 through an input terminal PB of the switching circuit 96 during reproducing. The position difference data S48 indicating a track address which is the sum of the offset track address indicated by the offset position signal S63 and the track address indicated by the position difference detection signal S62 is obtainable at an output terminal of the addition circuit 94. The drum motor 2 (FIG. 7A) is driven in accordance with the position difference data S48 (FIG. 7B) through the position gain circuit 97, an address difference smoothing circuit 99, the addition circuit 85, the digital/pulse width modulator circuit 86, the drive amplifier circuit 87 (FIG. 7A) and the carrier filter 88, which produces the signal S45. The rotary drum 3 is thus driven in a servo operating state wherein the position difference data S48 becomes "0".

As a result, the rotational position of the rotary drum 3 (namely the scanning position of the rotary magnetic heads 12A, 12B with respect to the magnetic tape 6) is offset in that the read track address RTA is modified by the track address of the offset position signal S63.

In the construction of FIG. 7A to FIG. 10C, the switching circuits 93, 96 and 98 of the servo signal processing circuit 82 are kept changed to the respective input terminals PB during reproducing. Therefore, the rotary drum 3 is subjected to a servo control substantially in accordance with the track address data TA (FIG. 10C) of the address data AD (FIG. 10B) included in the pickup signal S26 obtained from the rotary magnetic heads 12A and 12B. The scanning position of the rotary magnetic heads 12A and 12B on the magnetic tape 6 is set by the offset position signal S63 supplied by the offset position assigning circuit 143.

That is, the pickup signal S26 is taken into the reproducing signal processing circuit 13C through the head switching circuit 13A and the reproducing amplifier circuit 13B of the recording/reproducing circuit 13. Therefore, when the audio data DATA is written in the time base correction memory 126 from the data separation circuit 124 (FIG. 9) and also read by the read address forming circuit 129, the track address TA separated in the data separation circuit 124 is compared with the read track address RTA obtained from the read address forming circuit 129 in the track address comparator circuit 140. The detection address signal S61 indicating the deviation is supplied to the servo signal processing circuit 82 (FIG. 7B) as the position difference detection signal S62. The servo signal processing circuit 82 is therefore controlled to a servo operating state where the position difference data S48 becomes "0".

If the tape cassette 4 recorded by means of a plurality of plug-compatible machines comprising the rotary head recording and reproducing apparatus constructed as shown in FIGS. 7A and 7B is reproduced interchangeably, then there may be a case where the angle of the scanning path of the rotary magnetic heads with respect to the recording tape in each plug-compatible machine does not coincide with the recording track. This can result because of a difference in structure of the tape running system. In that case, a rotary magnetic head 12A (or 12B) scans across the recording track 57 slantwise as shown in FIG. 11.

That is, when the angle of the scanning path SCN1 of the rotary magnetic head 2A (or 2B) coincides with the recording path of the recording track 57, the rotary magnetic head 2A (or 2B) scans the n-th recording track 57 whereat the azimuth angle coincides. The rotary magnetic head 2A (or 2B) thus picks up recording data from the n-th recording track 57.

Figure 11:
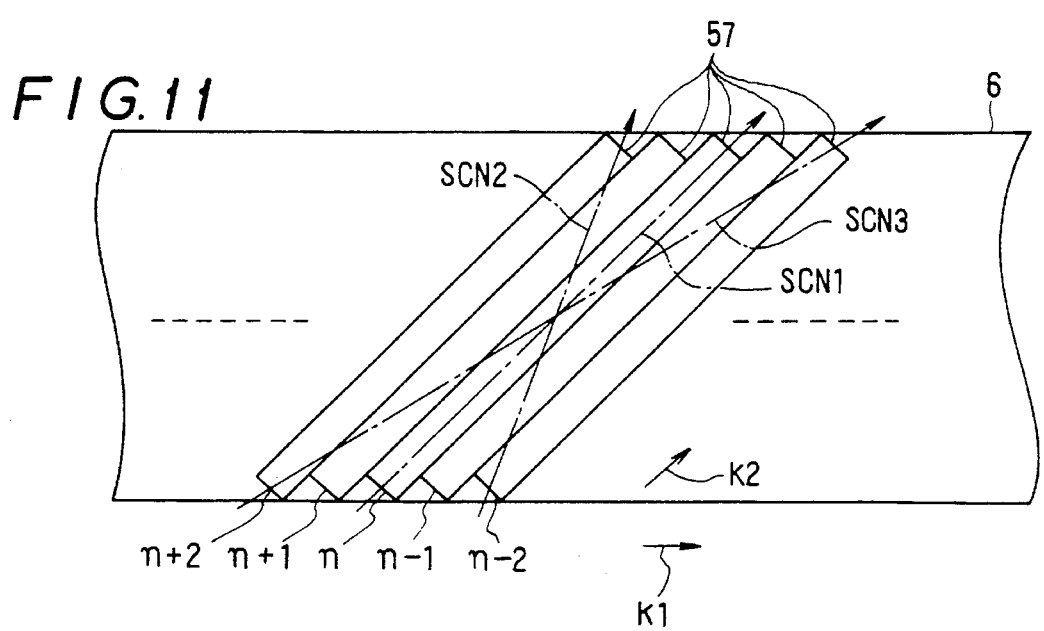
FIG. 11 is a schematic diagram showing scanning paths on a magnetic tape.

When the scanning angle of the rotary magnetic head 2A (or 2B) does not coincide with a recording path of the recording track, the rotary magnetic head 12A (or 12B) scans the n-th recording track 57 slantwise, and if the deviation of the scanning angle is large enough, the rotary magnetic head 2A (or 2B) also scans the neighboring recording tracks where the azimuth angle coincides, namely the (n+2)-th and the (n−2)-th recording tracks 57, as indicated by scanning paths SCN2 and SCN3 in FIG. 11. Thus the rotary magnetic head 12A (or 12B) picks up recording data not only from the n-th recording track 57 but also at least from the (n−1)-th and the (n+1)-th recording tracks 57 on opposite sides of the n-th track.

In a scanning state wherein, for example, the offset phase signal S63 of the offset position assigning circuit 143 (FIG. 7B) has been set to an offset-free state, the following operation takes place.

In a first scanning state in which the scanning path SCN1 is followed, the read address forming circuit 129 (FIG. 9) sends the read track address RTA for reading audio data of the recording tracks 57 of the reference track addresses n−1, n, n+1, as shown in FIG. 12A, from the time base correction memory 126 (FIG. 9) in accordance with the reference synchronizing signal S60 of the reference counting circuit 92 (FIG. 7B).

The track address TA separated from the data separation circuit 124 (FIG. 9) in accordance with the pickup signal S26 of the rotary magnetic head 12A (or 12B) of the rotary drum 3 is then ready for the rotary magnetic head 12A (or 12B) to scan the track of address n during the whole scanning period. When the read track address RTA assigns the track addresses n−1, n, n+1 successively (FIG. 12A), it operates to provide the track address TA obtained from the identical track addresses n−1, n, n+1 to the track address comparator circuit 140 (FIG. 9), as shown in FIG. 12B.

Accordingly, a "0" level signal as an address difference between the read track address RT and the track address TA is appropriated, as shown in FIG. 12C, to the position difference detection signal S62 provided to the switching circuit 93 of the servo signal processing circuit 82 (FIG. 7B) by way of the bus interfaces 141, 142 and in accordance with the detection address signal S61 of the track address comparator circuit 140.

Thus when the "0" level position difference detection signal S62 is supplied to the servo signal processing circuit 82, a value of the position data S50 to be added to the speed data S42 at the addition circuit 85 is "0", and the drum motor 2 causes the rotary drum 3 to rotate at a speed such as to make the magnetic tape 62 draw the first scanning path SCN1.

However, in such an operating state, if the rotational position of the rotary drum 3 is shifted, the track address TA obtained from a pickup signal S24 of the rotary magnetic heads 12A and 12B when the read track address RTA (FIG. 12A) assigns the track addresses n−1, n, n+1 is shifted toward the preceding or following track. Hence the position difference detection signal S62 is shifted from the "0" level state of FIG. 12C to the "+1" (positive) signal level or the "−1" (negative) signal level.

In this case the position data S50 corresponding to the shift added to the speed data S42 in the addition circuit 85 (and therefore the driving speed of the drum motor 2) is modified in the direction removing the shift, and the scanning position of the rotary magnetic head 12A (or 12B) is brought back to the track addresses n−1, n, n+1 assigned by the read track RTA.

When the tape cassette 4 scanning thus on the first scanning path SCN1 is installed, the rotary drum 3 is controlled to a position servo state where the rotary magnetic heads 12A and 12B are made to scan successively on the same recording track.

When the rotary magnetic heads 12A and 12B trace the scanning path SCN2 across the recording track slantwise, as shown in FIG. 11, so that the read track address RTA of the read address forming circuit 129 assigns the track addresses n−1, n, n+1 in that order as shown in FIGS. 13A, 13B and 13C corresponding to FIGS. 12A, 12B and 12C, the track addresses TA obtained from the data separation circuit 124 in accordance with the pickup signal of the rotary magnetic head 12A (or 12B) are (n−2, n−1, n), (n−1, n, n+1), (n, n+1, n+2) as shown in FIG. 13B. Thus when the scanning path SCN2 crosses the track addresses n−1, n, n+1, the azimuth angle scans the identical neighboring recording tracks on the running-in side and breakaway side of the rotary magnetic head 12A (or 12B).

In this case the position difference detection signal S62 supplied to the switching circuit 93 of the servo signal processing circuit 82 in accordance with the detection address signal S61 indicating an address deviation between the read track address RTA and the track address TA in the track address comparator circuit 140 becomes "0", as shown in FIG. 13C, when the track address TA is equal to the read track address RTA. The timing is such that the track address TA becomes unequal to the read track address RTA before and after it is equal thereto. A negative deviation signal DN1 and a positive deviation signal DP1 indicating the address deviation are generated.

When such position difference detection signal S62 is supplied to the addition circuit 85 as the position data S50, the servo output signal S44 for averaging the deviation signals DN1 and DP1 is obtained through a system comprising the digital/pulse width modulator circuit 86, the drive amplifier circuit 87 and the carrier filter 88. The drum motor 2 is thus in a driving state such as not to modify the rotational speed (which is assumed to be free from deviation) when the deviation signals DN1 and DP1 are equal to each other.

If scanning positions of the rotary magnetic heads 12A and 12B are shifted, the times for the rotary magnetic heads 12A and 12B to scan the adjacent recording tracks become unequal, and thus the times for the position difference detection signal S62 to generate the deviation signals DN1 and DP1 become unequal to each other. In this case the drum motor 2 has its rotational speed controlled in such a direction that the deviation signals DN1 and DP1 are equal to each other, and finally is driven in a servo control state wherein a mean value of the position difference detection signal S62 becomes "0".

Sometimes the rotary magnetic heads 12A and 12B will trace a scanning path running in from the succeeding recording track and crossing the preceding recording track as indicated by a scanning path SCN3 in FIG. 11. In this case, the read track address RTA (FIG. 14A) of the read address forming circuit 129 assigns the track addresses n−1, n, n+1, and the track address TA separated from the data separation circuit 124 in accordance with the pickup signal S24 of the rotary magnetic heads 12A and 12B generates track addresses indicating that the adjacent recording tracks are scanned before and after the identical track addresses n−1, n, n+1. As FIG. 14C shows, the position difference detection signal S62 corresponding thereto is such that deviation signals DP2 and DN2 equal in duration to each other are generated as in the case of the deviation signals DN1, DP1 of FIG. 13C except that curvatures of the signal level are reverse.

In this case, when the phase data S50 corresponding to the phase difference detection signal S62 is provided to the addition circuit 85, the drum motor 2 has its rotational speed controlled so as to make the durations of the deviation signals DP2 and DN2 equal to each other.

If for any reason the scanning phase of the rotary magnetic heads 12A and 12B is shifted from such servo state to the recording track on a preceding side or to the recording track on a succeeding side, then an unbalanced position difference detection signal S62, in which the duration of the deviation signal DP2 or DN2 becomes longer in accordance with the magnitude of the shift, is generated, and the position data S50 corresponding thereto is supplied to the addition circuit 85. The drum motor 2 thus corrects its rotational position in such a direction as to remove the imbalance.

Thus in the case of the scanning path SCN3, scanning positions of the rotary magnetic heads 12A and 12B can simply be subjected to a servo control.

(4) Other Embodiments

1. In the embodiment described in detail above, the construction is such that the address signal indicating a scanning position of the rotary magnetic heads 12A and 12B is obtainable from recording the track addresses and the block addresses on the recording tracks 57 (FIG. 5) together with the information data comprising blocked digital data. However, the track addresses and the block addresses comprising a digital signal each may be recorded instead together with an analog information signal. The recording track 57 will then be arranged in blocks BLK, and the address signal is ready for picking up from each block.

2. In the embodiment described in detail above, a digital signal is used as the address signal. However, a similar effect can be obtained by recording a control signal (or so-called CTL signal), a pilot signal and the like along the recording track 57 instead of a digital address signal, and subjecting the driving motor to a servo control using the CTL and pilot signals, etc. as an address signal during reproducing.

3. In the embodiment described in detail above, the rotary drum 3 is driven by the drum motor 2 (FIG. 3), and the driving force is transferred to the capstan 15 through the driving gear 31'. However, the driving system is not necessarily limited thereto. For example, a capstan motor may be employed and the driving force of the capstan motor may be transferred to the rotary drum 3, or a common single driving motor may be provided for the rotary drum 3 and the capstan 15, and the rotary drum 3 and the capstan 15 may be driven by the common driving motor through a transmission system and so forth. In short, by using a single driving motor to drive the rotary drum 3 and the capstan 15 at a predetermined speed ratio, the running speed of the magnetic tape 6 during reproducing will be controlled so as to lock the scanning track address of the rotary magnetic head with respect to the reference address position.

4. In the embodiment described in detail above, the phase detection signal S1 during recording is obtained from the pulse generator 22 provided at the rotary drum 3. However, the pulse generator 22 is not necessarily positioned at the rotary drum 3. The phase detection signal S1 may be taken instead from the driving system for the rotary drum 3 and the capstan 15.

While preferred embodiments of the invention are described above, it will be clear to those skilled in the art that various changes and modifications may be made therein without departing from the invention. The invention includes all such changes and modifications as fall within the spirit and scope of the appended claims.

What is claimed is:

1. A rotary head tape recording and reproducing apparatus for recording or reproducing an information signal including address data on or from recording tracks formed on a magnetic tape across a longitudinal direction of said magnetic tape, the apparatus comprising:

rotary head means;

head drum means mounting the rotary head means and supporting a magnetic tape wound helically around the head drum means along a predetermined wrap arc, the rotary head means recording or reproducing the information signal on or from the magnetic tape;

capstan means for driving the magnetic tape;

a take-up reel for taking up the magnetic tape;

transmission gear means connected to the head drum means, the capstan means, and the take-up reel and having respective predetermined reduction ratios with relation to each of the head drum means, the capstan means, and the take-up reel;

a single motor for driving the head drum means, the capstan means, and the take-up reel through the transmission means, at least the head drum means, the capstan means, and the take-up reel being driven in rotation, the rotational speed of the capstan means and the take-up reel relative to the head drum means being directly dependent on said reduction ratios of the transmission gear means with relation to each of the head drum means, the capstan means, and the take-up reel;

reference means for generating first and second reference signals to serve as respective bases for comparison;

means for generating a first output signal representing a rotational state of the rotary head means;

means for generating a second output signal representing address data reproduced from the magnetic tape by the rotary head means;

comparison means operative in a recording mode for comparing the first reference signal with the first output signal to produce a first comparison signal and in a reproducing mode for comparing the second reference signal with the second output signal to produce a second comparison signal; and servo control means operative in the recording mode for controlling the motor in accordance with the first comparison signal and in the reproducing mode for controlling the motor in accordance with the second comparison signal.

2. A rotary head tape recording and reproducing apparatus as claimed in claim 1 wherein the comparison means is responsive to the rotary head means and the first output signal is a signal representing a phase angle and generated in accordance with the rotation of the rotary head means.

3. A rotary head tape recording and reproducing apparatus as claimed in claim 2 further comprising a pulse generator and wherein the first output signal is a pulse signal generated by the pulse generator.

4. A rotary head tape recording the reproducing apparatus as claimed in claim 1 wherein the first reference signal comprises a reference signal representing a phase angle.

5. A rotary head tape recording and reproducing apparatus as claimed in claim 1 wherein the first reference signal comprises a reference clock signal.

6. A rotary head tape recording and reproducing apparatus as claimed in claim 1 wherein the comparison means is responsive to the rotary head means and the second output signal comprises a reproduced address signal.

7. A rotary head tape recording and reproducing apparatus as claimed in claim 6 further comprising memory means for temporarily memorizing an information signal reproduced by the rotary head means and wherein the second reference signal comprises a read address data signal facilitating reading the information signal.

8. A rotary head tape recording and reproducing apparatus as claimed in claim 1 wherein the second reference signal comprises a reference address signal.

9. A rotary head tape recording and reproducing apparatus as claimed in claim 1 further comprising means for generating a third reference signal, and arithmetic adder means for the first comparison signal and the third reference signal to produce a first addition signal and wherein, in a recording mode, the servo control means controls the motor in accordance with the first addition signal.

10. A rotary head tape recording and reproducing apparatus as claimed in claim 9 further comprising a phase assigning circuit for assigning a lock phase of the head drum means and wherein the third reference signal comprises a phase assigning signal produced by the phase assigning circuit.

11. A rotary head tape recording and reproducing apparatus as claimed in claim 9 and further comprising means for generating a fourth reference signal, and arithmetic adder means for adding the second comparison signal and the fourth reference signal to produce a second addition signal and wherein, in a recording mode, the servo control means controls the motor in accordance with the second addition signal.

12. A rotary head tape recording and reproducing apparatus as claimed in claim 11 further comprising an offset position assigning circuit and wherein said fourth reference signal comprises offset position assigning address data generated by the offset position assigning circuit, whereby the motor is adjusted in rotational phase.

13. A rotary head tape recording and reproducing apparatus as claimed in claim 1 wherein the servo control means comprises a speed comparison circuit that compares a reference speed of the head drum means and a reference speed and generates a third comparison signal which is a function of the rotational speed of the rotary head means, and the servo control means controls the motor by a third addition signal which is the sum of the first or second comparison signal and the third comparison signal.

14. A rotary head tape recording and reproducing apparatus as claimed in claim 1 wherein the motor comprises a drum motor integrated with the head drum means.

15. A rotary head tape recording and reproducing apparatus as claimed in claim 1 wherein the motor comprises a capstan motor integrated with the capstan means.

16. A rotary head tape recording and reproducing apparatus as claimed in claim 1 wherein the transmission gear means comprises a motor pinion gear rotated integrally with the motor, a capstan gear rotated integrally with the capstan means, and at least one relay gear connecting the motor pinion gear and the capstan gear.

17. A rotary head tape recording and reproducing apparatus as claimed in claim 1 wherein the motor also drives a take-up reel base which winds the magnetic tape.

* * * * *